Jan. 24, 1956 L. LEITZ ET AL 2,731,894
FILM CONTAINER FOR ROLL FILM CAMERA
Filed July 25, 1951 2 Sheets-Sheet 1
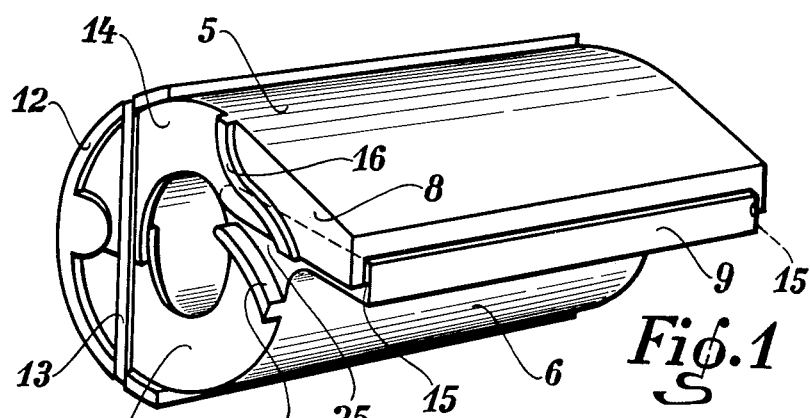
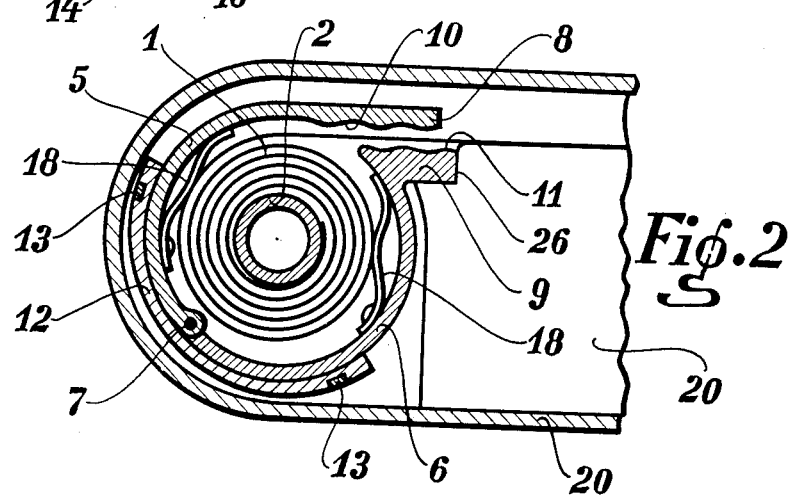
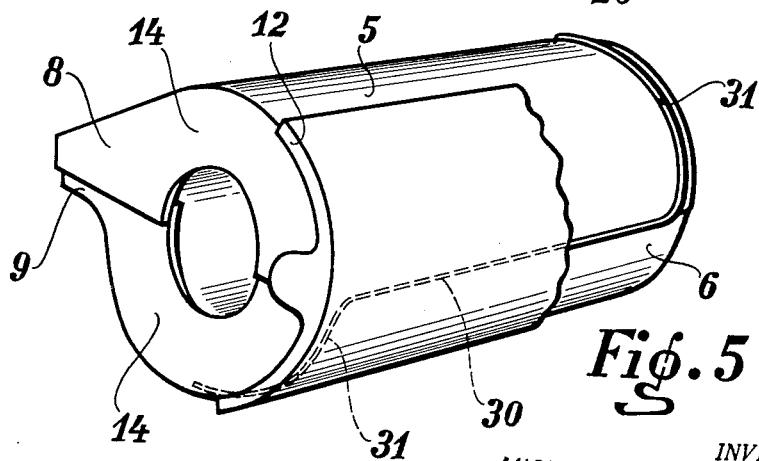
INVENTORS
LUDWIG LEITZ
HUGO WEHRENFENNIG Jan. 24, 1956   L. LEITZ ET AL   2,731,894
FILM CONTAINER FOR ROLL FILM CAMERA
Filed July 25, 1951
2 Sheets-Sheet 2
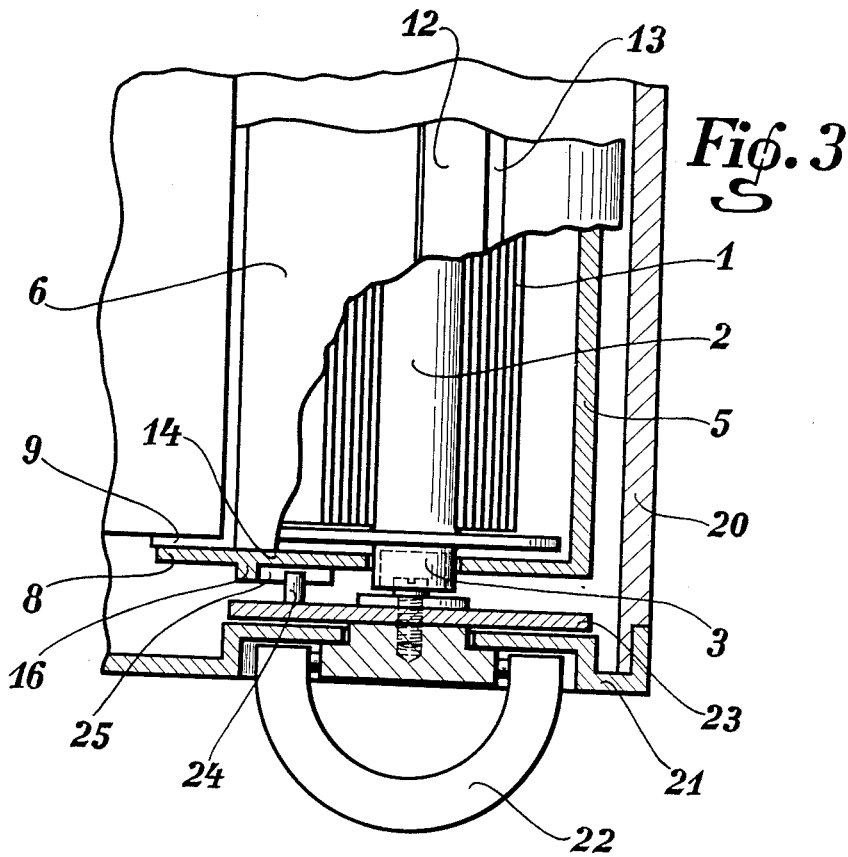
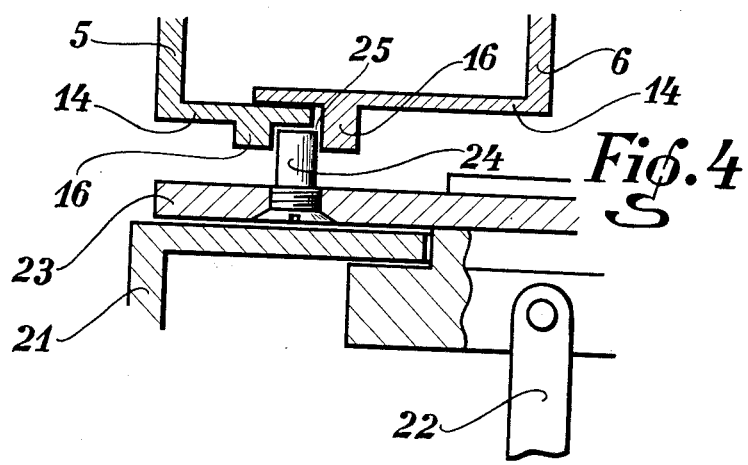
LUDWIG LEITZ    INVENTORS
HUGO WEHRENFENNIG
BY
Ivan E. A. Kinigsberg United States Patent Office 2,731,894
Patented Jan. 24, 1956

2,731,894
FILM CONTAINER FOR ROLL FILM CAMERA

Ludwig Leitz and Hugo Wehrenfennig, Wetzlar (Lahn), Germany, assignors to Ernst Leitz, G. m. b. H., a corporation of Germany Application July 25, 1951, Serial No. 271,334

Claims priority, application Germany July 31, 1950

3 Claims. (Cl. 95—31)

This invention relates to improvements in film containers for roll film cameras and the object of the invention is to provide a novel and improved film container of simple and practical construction and design including novel means for closing the container lighttight for the protection of the film within the container against damage by the entrance of light. Other objects are to provide novel means for opening the container after it has been placed within the camera and other means within the container for protecting the film against surface damage. Other objects and features will appear hereinafter.

The invention is embodied in a film container consisting of two semicylindrical shells which are hinged together lengthwise so as to form a cylindrical container with overlapping end walls. Each of the shell portions is provided with a jaw having an inner surface which is waved or curved. When the container is closed the waved jaw surfaces intermesh and form the film exit opening.

Each of the shells carries a curved end guide and when the container is closed the guides form a narrowing channel in which a pin carried by the camera cover enters and is moved to spread the guides whereby to open the jaws for withdrawal of film from the container. The invention is disclosed in a film container adapted for use with a well known camera but is not limited thereto. The features of the invention may be adapted for use with other types of cameras. In the accompanying drawings:

Fig. 1 is a perspective view of the film container.

Fig. 2 is a transverse sectional view showing the container placed within a camera and with the film exit opening opened. Parts are in section and parts broken away.

Figs. 3 and 4 are sectional detail views, with parts broken away, and illustrate the means for opening the container exit to withdraw film.

Fig. 5 shows a modification.

Referring first to Fig. 3, the film 1 is wound upon a spool 2 having hubs 3 which rest rotatably in the end walls of the film container which consists of two semi-circular shells 5 and 6 hinged together lengthwise by a hinge 7, Fig. 2. Each shell is formed with a film jaw 8, 9, respectively, and each jaw has an inner film gripping waveformed or curved surface 10, 11, respectively. The shells are partly covered with a strip 12 of rubber-like material which permits the shells to open and at the same time covers the hinge 7 lighttight. The shells 5 and 6 are held together by a tendon-like elastic band or spring 13 supported in suitable grooves in the strip 12. The end walls 14, 14 of the two shells overlap as shown at 15. Each of the end walls at one end of the container carries a guide 16. The two guides form a narrowing channel 25 when the container is closed.

The empty container is shown in Fig. 1. When it is to be used, the container is opened and a spool of film placed therein as shown in Fig. 3, one end of the film projecting through the film exit opening between the jaws 8 and 9, Fig. 2. The container is then closed and is held closed by the band 13, the film being protected against the entrance of light. It is a feature of the invention that when the container is closed, the free end of the film is gripped between the jaws 8 and 9 and the waved surfaces grip the film firmly so that light cannot enter the container. The loading of the container may be done in daylight or in the dark room by using the well known daylight or darkroom film spools.

In order to prevent surface injury to the film as it is withdrawn from the container within the camera and the windings of the film tend to expand against the walls of the container, the latter is provided with flat springs 18, 18 so located that they engage the film on the perforated portions outside the image portions of the film and as will be understood. The resiliency of the springs 18 is so proportioned that while they overcome or restrain the expanding tendency of the film, the springs do not prevent the closing of the container by the band 13 which snaps and holds the two shells together. The diameter of the film windings will therefore not be greater than the space between the springs which yield slidably against the walls of the container as it is closed.

Fig. 5 shows a modification in which a Z-formed spring 30 with arms 31, 31 embraces the shells to close the container. Each of the spring arms 31 engages one of the shells as shown.

As shown in Fig. 3, the camera 20 has a cover 21 which in known manner is locked to the camera by a lock lever 22 having a locking disk 23 inside the camera. The disk carries a pin 24. After the film container has been placed in the camera and the cover is put on, the pin 24 will enter the channel 25 between the guides 16 and as the lock lever is turned the pin 24 forces the guides apart and thereby open the container. The pin 24 causes the jaws 9 to be moved against a stop 26 in the camera, Fig. 2, and at the same time lifts the other jaw 8. By these means the film exit opening between the jaws is opened and positioned within the camera so that film may pass out from the container.

The container may be made of metal, plastic or other material. The film spool is laid sideways into the container which is more convenient than axial insertion especially in a darkroom. It is to be noted that the waved surfaces of the jaws are clean and free of any surface lining such as has heretofore been proposed. If the jaws were lined with textile material, for example, such material would catch dirt and dust and injure the film as it passed between the jaws. Axial insertion of a film spool into a container necessitates a more complicated device, and at least one of the end walls of such container must be made removable. The manipulation of the film to thread it or connect it with the film moving means within the camera is not described or illustrated, it being well known camera practice.

The invention is not limited to the exact disclosure but changes and modifications may be made. We claim all such changes and modifications as come within the principle of the invention and the scope of the appended claims.

We claim:

1. In combination, a camera, a removable cover therefor and means on the cover to lock the same to the camera, a film container for said camera comprising two halves container portions hinged together lengthwise to form a container with the said two halves container portions movable about said hinge towards and away from each other to close and open the container, guide means on said container portions forming a channel only when said container is closed, a container opening member on said camera locking means automatically entering said channel to widen said channel to open the container when said locking means are actuated to lock the cover on the camera, said film container being a separate film containing unit manually insertable and detachable from said camera, means engaging said container halves to keep the container lighttightly closed after removal from the camera, a film gripping jaw formed on each of said container halves, said jaws opposing each other in film gripping relation when said container halves are closed to form a container, said jaws having opposed inner waved surfaces intermeshing in film gripping relation.

2. The combination according to claim 1 characterized by spring members secured to the inner walls of said container portions and adapted to engage the outer winding of a spool of film placed in the container to control the film during unwinding thereof.

3. The combination according to claim 1 characterized by a jaw formed integral with each of said container portions, said jaws forming a film exit opening from the container, the inner opposed surfaces of said jaws being unlined and waved to grip a film between them and a spring member embracing said container portions to keep the container closed with the said jaws gripping the film between them.

References Cited in the file of this patent

UNITED STATES PATENTS

| | | |
|---|---|---|
| 1,527,476 | Gianetto | Feb. 24, 1925 |
| 1,685,010 | Thornton | Sept. 18, 1928 |
| 2,166,543 | Collings | July 18, 1939 |
| 2,213,776 | Walter | Sept. 3, 1940 |
| 2,218,245 | Lindenberg | Oct. 15, 1940 |
| 2,336,278 | Mihalyi | Dec. 7, 1943 |
| 2,469,008 | Simmon et al. | May 3, 1949 |
| 2,487,479 | Roehrl | Nov. 8, 1949 |
| 2,519,753 | Goodhand | Aug. 22, 1950 |
| 2,537,883 | Ernisse | Jan. 9, 1951 |
| 2,575,024 | Mihalyi | Nov. 13, 1951 |

FOREIGN PATENTS

| | | |
|---|---|---|
| 620,062 | France | Jan. 12, 1927 |
| 650,013 | Germany | Sept. 9, 1937 |